Sept. 26, 1967          L. CASTOLDI          3,343,368
GRID FOR A WATER INTAKE OPENING, ESPECIALLY THE WATER INTAKE
OPENING OF A WATER JET PROPELLED BOAT
Filed Dec. 27, 1965          2 Sheets-Sheet 2
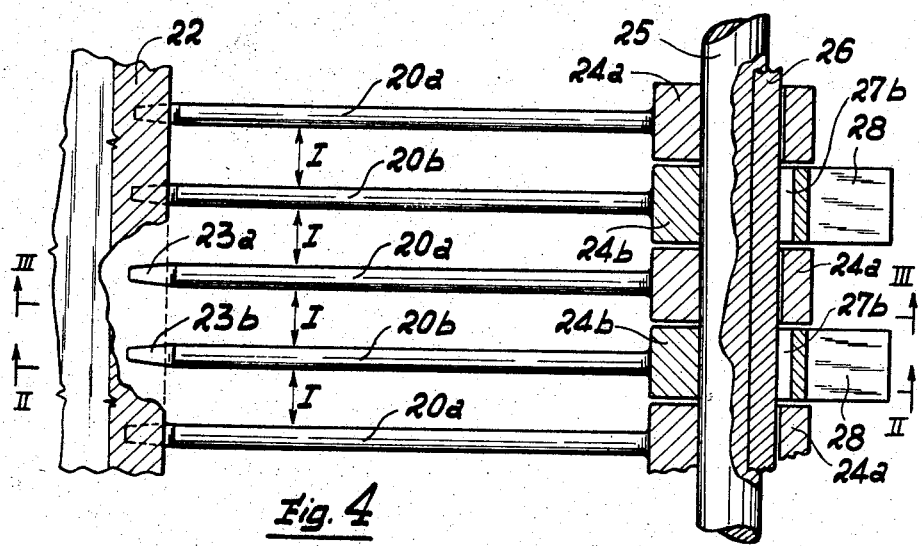
Fig. 4
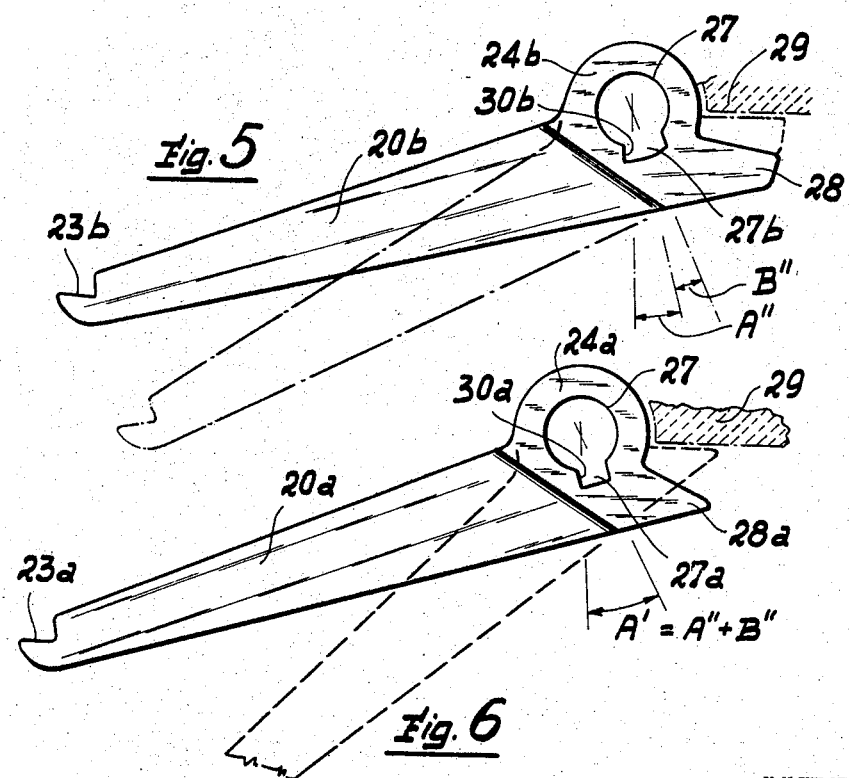
Fig. 5
Fig. 6
INVENTOR.
Luigi Castoldi
BY
Michael J. Striker

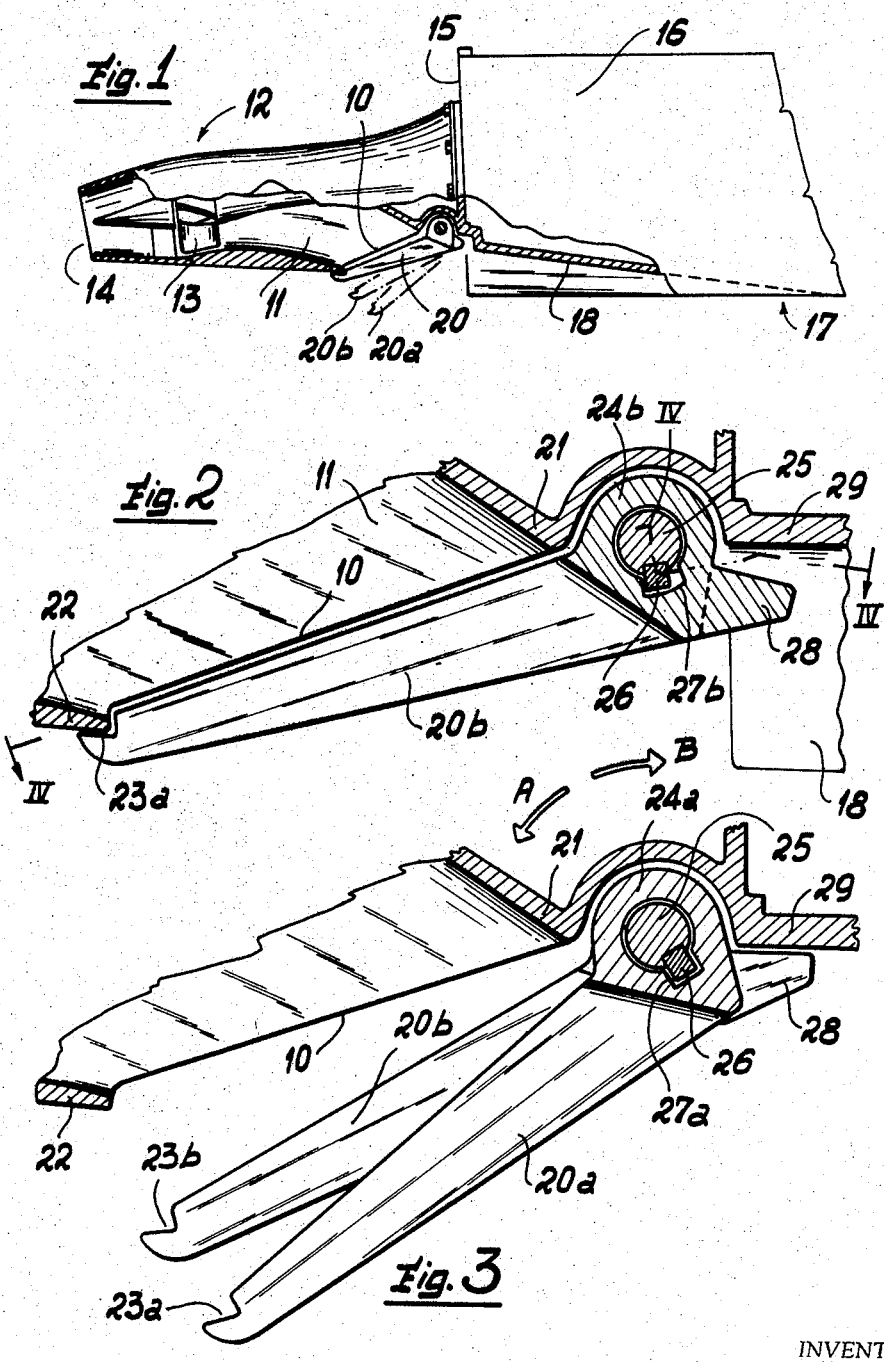

United States Patent Office 3,343,368
Patented Sept. 26, 1967

3,343,368
GRID FOR A WATER INTAKE OPENING, ESPECIALLY THE WATER INTAKE OPENING OF A WATER JET PROPELLED BOAT
Luigi Castoldi, 161 Viale Mazzini, Abbiategrasso, Italy
Filed Dec. 27, 1965, Ser. No. 516,508
7 Claims. (Cl. 60—221)

ABSTRACT OF THE DISCLOSURE

A grid for a water intake opening and especially the water intake opening of a jet propelled boat and comprising two sets of substantially parallel bars with the bar of one set alternatingly arranged with the bars of the other set, in which the bars are mounted in the region of one end thereof adjacent one edge of the opening for pivotal movement about a common axis between a service position extending substantially in one plane transversely spaced from each other over the opening and a cleaning position turned about the common axis out of the plane with the bars of one set angularly displaced from the bars of the other set.

---

This invention generally relates to jet propulsion units for marine vessels and, more particularly, to an improved propulsion unit for use in shallow draft boats and the like.

At least one form of water propelled boat involves an engine arranged to drive a turbine which is located within a conduit having an intake opening at or adjacent to the bottom of the boat, and a jet orifice. Upon actuation of said turbine, water is drawn into the said conduit through said intake opening, is pumped through said conduit and is exhausted through said jet orifice in a stream from the rear of the boat, the stream generally leaving the boat above the water within which the boat is floating or is hydrodynamically supported. The propulsion principle depends directly on a basic law of physics which provides that any action has an equal and opposite reaction. Thus, as water is accelerated and ejected astern, the boat moves forward. It is generally accepted that to maintain the inherent mass-to-velocity ratio, in the accelerated stream of water, within reasonable limits, proportionally to the weight, the design and the character of the boat, a relevant flow of water is drawn through said intake opening.

Such jet propelled boats are particularly adapted and used for navigation on shallow waters such as along rivers, swamps, beached seashores and the like. Floating and submerged solid objects and debris are in general found in such waters. In addition, an appreciated feature of boat jet propulsion consists in the fact that jet propelled shallow draft boats are capable to run aground and to positively contact gravel, debris and underwater vegetation at the water bottoms. A strong drawing action of stones, debris and weeds into said intake opening therefore occurs and is to be dealt with in designing, constructing and operating said boats and the jet propulsion units thereof, usually by providing said intake opening with a suitable baffle grid.

According to an accepted structural concept, said jet propulsion units are provided with baffle grids consisting of a plurality of bars, preferably arranged in parallel, coplanar and spaced relationship in the area defined by the outline of said intake opening and spaced so as to allow water to flow freely between them, but to prevent substantial entry of foreign debris and solid objects into the confined passage wherein the turbine is located and operates.

During actual use of boats as referred to above, solid objects, such as stones, debris, vegetables, wooden splinters and so on, violently impinging on said baffle grids and forced between the adjacent bars thereof, will become wedged therebetween or entwined thereabout, partially clogging the intake opening and anyway detrimentably affecting the efficiency of the propulsion unit. Removal of debris and object so fitted and restrained in said baffle grid requires hauling ashore of the boat and forcing the objects off from between the grid bars, by hammering, by using a pinch bar or other tool, which can sometime damage the baffle grid structure and components.

A somewhat self-clearing grid has been heretofore proposed to at least partially overcome the above disadvantage. Such grid consists of a plurality of parallel bars integrally supported at one end thereof, namely at the fore end with respect to the direction of travel of the boat, to form an essentially comb-like structure. Such structure is pivotally supported about a transverse axis adjacent to the fore transverse side of the intake opening and connected, by means of a suitable transmission, to handle means located inboard and which can be operated even when the boat is navigated. Said known structure and the controls therefor are so arranged that the grid can be usually maintained co-planar to the plane defined by the contour of the intake opening, while the grid structure can be downwardly swung to a certain extent to facilitate the slipping away of the objects towards and over the unsupported rear ends of the bars thereof, said slipping away being caused by the relative rearward motion of the water flowing between the grid bars. It has been however found that such swingable grids could be cleared from very loosely fitted objects only.

It is therefore an object of this invention to provide a new and improved jet propulsion unit for a boat, comprising an intake opening baffle grid which is not subject to the above limitations and, particularly, which can be positively cleared from solid objects such as debris and weeds, even if the same are deeply and forceably wedged between the grid components, upon action exerted from inboard.

More particularly, an important object of this invention is to provide an improved downwardly swingable baffle grid structure comprising a plurality of spaced rods supported for swinging movement about a transverse axis adjacent to the fore transverse side of the intake opening confinement from an upper service position wherein said rods are essentially co-planar and parallel to each other to a lower self-clearing position wherein the spacings between adjacent bars is greater than the spacings existing therebetween when at said upper position, whereby solid objects and debris stuck and forceably locked between said bars in said upper position will be loosened and caused to clear off when said bars are moving towards and attain said lower position.

According to a further important object of this invention, the improved self-clearing baffle grid structure comprises a first set and a second set of grid bars, the bars of said first set being alternately arranged with the bars of said second set, all the bars pivotally supported for downward rotation about a common axis passing through the fore end portion of each bar, means being provided for concurrent downward and upward rotation of all bars from and respectively to said upper position, and for causing the bars of said first set to downwardly move at an extent greater than the bars of said second set as said bars are caused to move towards said lower position, whereby the spacing between any pair of adjacent bars will increase as said bars are moved from said upper position to said lower position thereof.

These and other objects and advantages of the present invention will appear more fully in the following specification and claims, when taken into conjunction with the accompanying drawings, forming an essential component of this disclosure, and wherein:

FIGURE 1 is a rather simplified, partly longitudinal sectional view and partly side elevational view of the stern portion of a shallow draft boat provided with a jet propulsion unit improved according to the invention;

FIGURE 2 is a fragmentary detailed sectional view of the novel baffle grid structure of the invention, set at its upper service position, the view being taken substantially on the line II—II of FIG. 4;

FIGURE 3 is a view similar to that of that of FIG. 2, but showing the structure at its lower self-clearing position and taken substantially on the line III—III of FIGURE 4, wherein the baffle grid is fragmentarily shown from above and partly in sectional view taken substantially on the broken line IV—IV—IV of FIG. 2; and FIGURES 5 and 6 illustrate in side view individual components of the first and respectively of the second set of bars, the component shown in FIG. 6 being constructed according to slightly modified embodiment of the invention.

Referring now to the drawings and, in particular, referring first to FIG. 1, a jet propulsion unit of the type considered includes an intake opening generally designated by the numeral 10 and forming the inlet passage for a water stream drawn into passage 11 within the propulsion unit structure, generally designated at 12, and wherein a turbine or a pumping device, such as a waterscrew 13 is conventionally supported for rotation and driven to provide the necessary acceleration to water and the ejection of a jet of water from the outlet or nozzle 14 of the unit. The propulsion unit is further provided with jet deflecting means for steering and reversing the movement of the boat and with other various ancillary devices which have been omitted in the drawings for purposes of clarity and which will not be described as not being pertinent to this invention nor necessary for full understanding of the same.

The propulsion unit 12 is shown as extending astern from and secured to the transom 15 of the boat hull 16, wherein the engine (not shown) is located and connected to the unit drive shaft, the arrangement and the configuration of the unit being however not limiting of the invention except insofar the critical features defined hereinbelow are concerned and as set forth in the appended claims.

The bottom 17 of the essentially shallow draft hull is preferably provided with a downwardly open channel the upper or ceiling wall 18 of which is slightly upwardly sloping, to confine the stream of water (assuming, for simplicity, that the water is moving, that is considering the relative motion of water with respect to the boat) towards the intake opening 10 of the unit. Further, said intake opening is preferably upwardly inclined, as shown in FIG. 1, while the entire propulsion unit is located above the level defined by the bottom 17 of the hull.

Such configuration and relative arrangement of parts, while being advantageous for the efficiency of the jet propulsion as ensuring minimum drag and minimizing water deflection, have been proved as advantageous in view of self-clearing of the baffle grid, as it will be apparent as this description proceeds.

The intake opening is of conventional configuration and its area may be confined within a nearly rectangular framing having parallel lateral sides, a fore transverse side and a rear transverse side, said latter sides being fragmentarily shown in FIGS. 2, 3 and 4 and designed by numerals 21 and respectively 22. The baffle grid designed to prevent entry of foreign objects and debris into passage 11 comprises a plurality of bars generally indicated at 20 in FIG. 1, constructed, arranged and supported so that, during regular service of the boat, said bars extend longitudinally located over the intake opening in co-planar, parallel and uniformly spaced relationship. Said bars are preferably of sturdy construction and of flattened cross-sectional configuration having its major dimension in a vertical plane so as to allow water to flow freely between them.

The plurality of bars includes a first set of bars 20a and a second set of bars 20b, the bars 20a and 20b being alternately arranged as shown in FIG. 4, at uniform lateral intervals I. Each bar is preferably rearwardly tapered and has an unsupported rear end portion 23a and respectively 23b shaped for abutment from below on the edge of the structural stationary component forming the transverse rear side 22 of the intake opening.

As shown in FIGS. 2, 3 and 4, all bars are structurally similar to each other. Each bar is secured to and preferably integrally formed with an enlarged hub portion 24a, respectively 24b at its fore end, and said hub portions are bored at 27 (FIGS. 5 and 6) for fitting a shaft 25 therethrough. Said shaft 25 is supported for rotation parallel to and adjacent to the fore transverse side 21 of the intake opening 10, and defines a common axis about which all said bars 20a and 20b can be downwardly swung from the co-planar service position shown in FIG. 2. Said shaft 25 is engaged for rotation with any individual bar, such as by means of a key 26, so that, upon rotation of said shaft in direction B (FIG. 3) all bars are caused to be upwardly rotated and maintained at their upper service position of FIG. 2, defined by the abutment of their unsupported rear ends 23a and 23b on the rear side 22 of the intake opening, in said essentially co-planar and parallel relationship, to protect said intake from entry of foreign objects.

Now, according to a critical feature of the invention, the rotary engagement of said shaft 25 with bars 20a, respectively 20b is such that, upon rotation in direction A of shaft, the said bars 20a of the first set are caused to downwardly swing to an extent greater than the extent of the lowering of bars 20b, as shown in FIG. 3. Therefore, as all bars are lowered to their lowest position, the interval between any pairs of adjacent bars (any bar 20a is adjacent to one or two bar(s) 20b only, and vice versa, as shown in FIG. 4) will become greater than the uniform interval I existing between the same adjacent bars when at their uppermost service position.

The increasing of said interval will loosen the gripping of any solid object which could have even very forceably wedged between the bars of the baffle grid, and said object will simply drop off the grid or be carried away in the stream of water, well below the intake opening. The inclined preferred arrangement of the intake opening and of the baffle grid thereof facilitate the clearing off of foreign debris and objects, while the passage thereof into the intake opening is prevented.

According to the embodiment of FIGS. 2 to 5 inclusive, the differential downward movement of the bars 20a and 20b is ensured by providing bars 20a (FIG. 3 and also FIG. 6) with a keyway 27a dimensioned for substantially precise confinement of key 26, so that said bars are caused to follow the shaft 25 in its rotation in direction A, while the bars 20b (FIGS. 2 and 5) are provided with a laterally extended keyway 27b ensuring a rotary clearance between said shaft and said bars, said clearance, indicated by angle B″ in FIG. 5, being equal to the amplitude of the angle formed between adjacent bars 20a and 20b, when at their lowest position shown in FIG. 3.

Preferably, means are provided for limiting the downward movement of the baffle grid bars. Such means may consist of protrusions 28 (FIGS. 2 to 5 inclusive) secured to or integrally formed with the hub portion 24b of bars 20b and arranged to act as stop means to limit the downward movement, preferably by abutting from below on the lower face of a structural stationary component of the framing of the intake opening, as shown in FIG. 3. The bars 20a will be at their turn limited as to their downward movement as the rotation A of shaft 25 is limited in its rotation by the clearance between key 26 and keyway 27a.

According to the modified construction of FIG. 6, the bars 20a are at their turn provided with an extension or protrusion 28a integrally formed with the hub portion 24a thereof, and designed to abut on same stationary part 29 as said bars 20a have completed their downward rotation of amplitude A', equal to the amplitude A" of the downward movement of bars 20b (until abutment of part 28 on part 29) plus the angular clearance B" between shaft 25 and same bars 20b. The provision of said extension 28a eliminates torsional stress on shaft 25 as all bars are individually supported when at their lowermost position (indicated in dot-and-dash lines in FIGS. 5 and 6).

The above described improved self-clearing baffle grid is controlled upon rotation of shaft 25. Such rotation will be provided by action exerted from inboard by any conventional means (a handle lever and a transmission) corresponding to those designed for controlling known self-clearing downwardly swingable grids, and easily conceivable by those skilled in the art. Such means to rotate shaft 25 does not form part of this invention and therefore any further discussion thereof is believed unnecessary.

It is thus seen that the objects and advantages of the present invention have been fully and effectively accomplished by the improved self-clearing baffle grid described and illustrated in the accompanying drawings. However, the present invention is susceptible to some modifications without departing from the spirit and principle thereof.

What is claimed is:

1. A grid for preventing solid objects to pass in a water intake opening comprising, in combination, a first set of bars and a second set of bars alternatingly arranged and transversely spaced from the bars of said first set, all of said bars being mounted adjacent one of the ends thereof for pivotable movement between a service position in which said bars extend over said intake opening substantially in one plane substantially co-planar to said intake opening and a cleaning position in which all of said bars are turned out of said one plane away from said intake opening and in which the bars of one set are arranged substantially in a second plane and the bars of the other set in a third plane differing from said second plane; and operating means constructed and connected to all of said bars for turning the same between said positions thereof.

2. A grid for preventing solid objects to pass in a water intake opening comprising, in combination, a first set of bars and a second set of bars alternatingly arranged and transversely spaced from the bars of said first set, said bars being mounted adjacent one of the ends thereof for pivotal movement about a common axis extending transverse to the elongation of said bars between a service position in which said bars extend substantially in one plane and substantially co-planar to said intake opening and a cleaning position in which the bars of said first set are turned about the common axis out of said plane through a greater angle than the bars of said second set; operating means movable between two end positions for turning the bars of said two sets between said positions thereof; and connecting means connecting said bars to said operating means, said connecting means for the bars of one set of bars including lost motion means constructed and arranged in such a manner so as to turn during movement of said operating means between said two end positions said first set of bars through a greater angle than the bars of said second set so that the bars of said sets in said cleaning position will be angularly displaced from each other so as to displace solid objects which became wedged between said bars while the latter were in said service position.

3. A grid as defined in claim 2, wherein said operating means includes a turnable shaft extending along said common axis, and wherein the bars of said first set are fixedly connected to said shaft for turning movement therewith and said lost motion means connect the bars of said second set to said shaft.

4. A grid as defined in claim 3, wherein each of said bars has at said one end a hub portion through said shaft extends, said hub portions being formed with key ways, and said connecting means including key means extending into said key ways, the key means extending into the key ways of said hub portions of the bars of said first set fit thereinto substantially without clearance, and the key ways of said hub portions of the bars of said second set have respectively a width greater than that of the key means extending thereinto so as to form said lost motion means.

5. A grid as defined in claim 2, and including stop means cooperating with said bars for limiting turning movements thereof beyond said cleaning position.

6. A grid as defined in claim 2, wherein said water intake opening forms the intake opening of a water acceleration and ejection passage of a jet propulsion unit of a boat, said intake opening being located adjacent to the boat hull bottom in a forwardly and upwardly sloping plane and having a substantially rectangular configuration, said common axis extending substantially parallel to and adjacent the fore transverse edge of said intake opening.

7. A grid as defined in claim 6, wherein said bars taper from said one toward the other end thereof and are provided at said other end thereof with notches adapted to engage in said service position the rear transverse edge of said intake opening.

References Cited

UNITED STATES PATENTS

| | | | |
|---|---|---|---|
| 1,700,913 | 2/1929 | Tawara | 60—221 |
| 3,040,695 | 6/1962 | Austin | 115—.5 |
| 3,082,732 | 3/1963 | Stallman | 60—221 X |
| 3,253,567 | 5/1966 | Patton | 115—.5 |

CARLTON R. CROYLE, *Primary Examiner.*